Sept. 3, 1935.  S. G. HICKOX  2,013,308

LIP STICK HOLDER

Filed July 27, 1933   2 Sheets-Sheet 1

INVENTOR
Sherman G. Hickox
BY
Philipp Sawyer Rice Kennedy
ATTORNEY

Sept. 3, 1935.  S. G. HICKOX  2,013,308
LIP STICK HOLDER
Filed July 27, 1933  2 Sheets-Sheet 2

INVENTOR
Sherman G. Hickox
BY
ATTORNEY

Patented Sept. 3, 1935

2,013,308

UNITED STATES PATENT OFFICE 2,013,308

LIP STICK HOLDER

Sherman G. Hickox, Waterbury, Conn., assignor to Scovill Manufacturing Company, Waterbury, Conn., a corporation of Connecticut Application July 27, 1933, Serial No. 682,372

4 Claims. (Cl. 206—56)

This invention relates to lipstick holders.

It is an object of the invention to provide an effective holder that is simple to manufacture and that is neat and decorative in appearance.

With this general object in view, the invention consists in the features, combinations, details of construction and arrangements of parts which will first be described in connection with the accompanying drawings and then more particularly pointed out.

In the drawings:

Fig. 7 is a side view of a modified construction;

Figure 1:
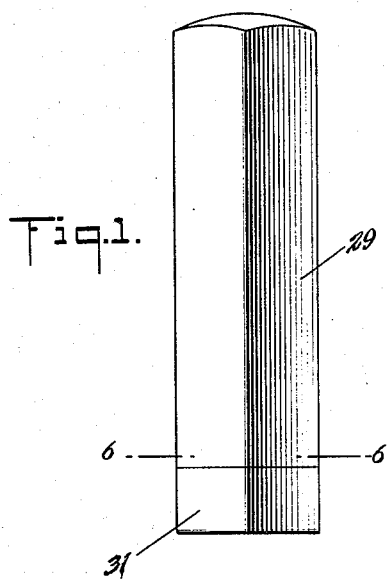
Fig. 1 is a side view of a lipstick holder constructed in accordance with the invention.

Referring to the drawings, and more particularly to Figs. 1-6, the lipstick holder there illustrated as an example includes an inner tube 15 having a longitudinal slot 16. Embracing tube 15 is a casing consisting of a sleeve 17 having a helical groove or channel 18 which may be conveniently formed by pressing the same in a tube. Slidable in the inner tube is a carrier cup 19 for a lipstick or cosmetic pencil 20. This carrier cup has a headed pin 21, the head of which is outside the cup and extends through a slot 16 into channel 18. The body of the pin extends inwardly of the carrier cup to serve as a stop and anchorage for the lipstick. The slot 16 and groove 18 form relatively inclined shoulders engaged by the pin to cause movement of the carrier as later described.

Figure 2:
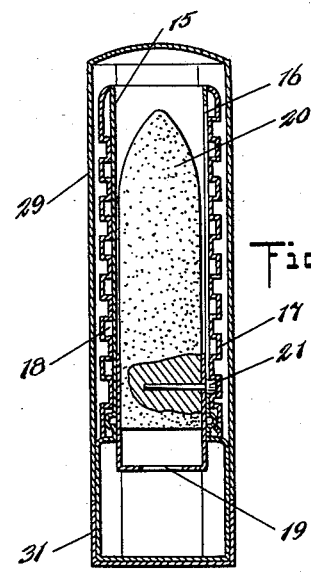
Fig. 2 is a vertical sectional view of the same, with parts cut away, showing the container closed.
Figure 3:
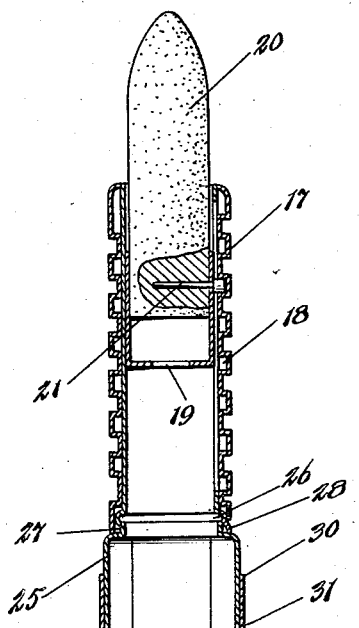
Fig. 3 is a similar view showing the container open and the lipstick advanced.
Figure 4:
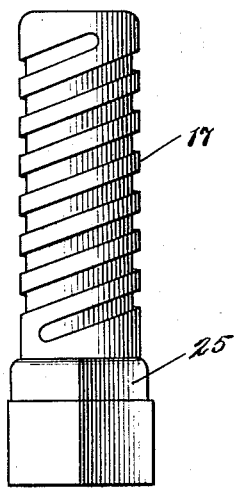
Fig. 4 is a side view of the holder with the cap removed.
Figure 5:
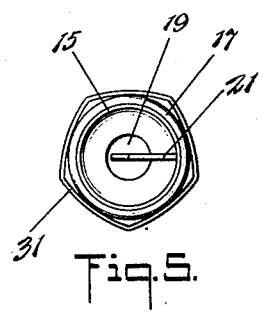
Fig. 5 is a top end view of the holder with the cap and the lipstick removed.

There is provided means for causing relative rotary movement between the inner tube and the casing. As shown as an example in Figs. 1-4, connected with the inner tube, as by being formed integral therewith, is an enlarged operating head 25. By holding the casing in one hand and rotating head 25 with the other, the inner tube is rotated in the casing. This, by reason of the pin 21 engaging the relatively inclined shoulders formed by slot 16 and groove 18, causes the carrier cup 19 to be advanced so as to project the lipstick to a position for use (Fig. 3). Reverse rotation withdraws the lipstick into the holder (Fig. 2).

To prevent relative axial movement of the tube and casing, at the same time permitting relative rotation, the inner tube is provided with an external bead 26 which, with the head 25, forms a groove 27. Riding in this groove is a nib 28 struck in from the metal of the sleeve.

Figure 6:
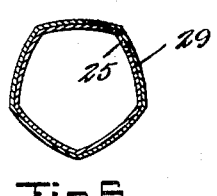
Fig. 6 is a sectional view taken on the line 6—6 of Fig. 1.
Figure 2:
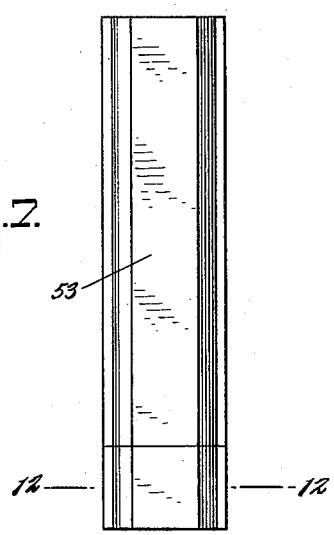
Figure 8:
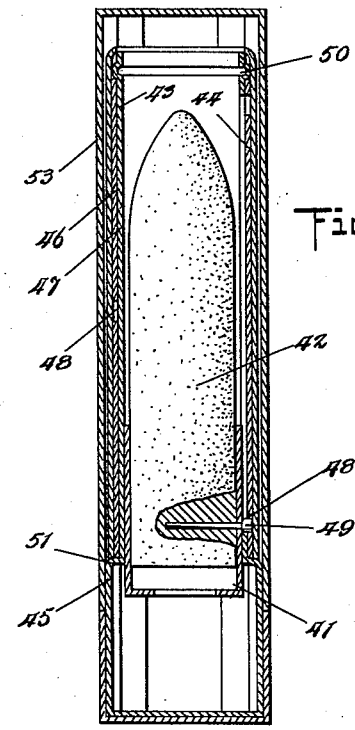
Fig. 8 is an enlarged vertical sectional view of the same with parts cut away, showing the holder closed.
Figure 9:
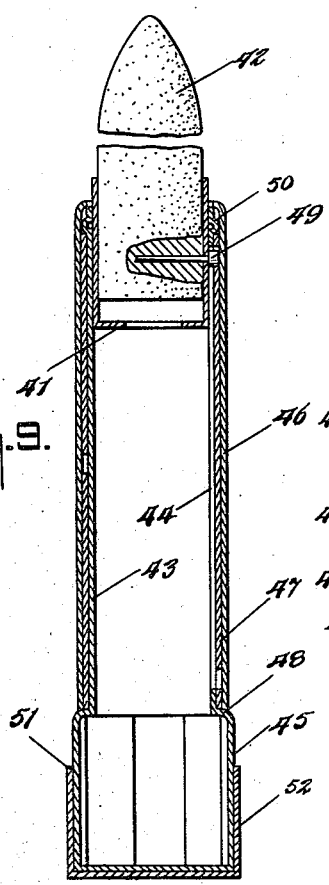
Fig. 9 is a similar view showing the holder open and the lipstick advanced.
Figure 10:
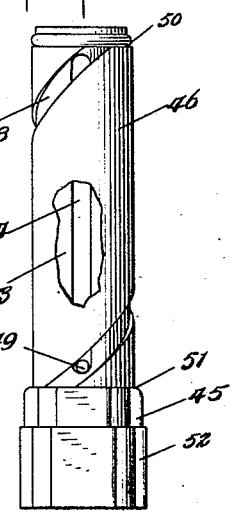
Fig. 10 is a view similar to Fig. 7 but with parts removed and broken away.
Figure 11:
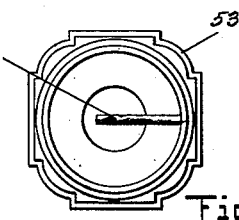
Fig. 11 is a top end view of Fig. 9 but with the lipstick removed.

The invention in its entirety includes a slip cap for enclosing the sleeve and fitting over the enlarged head, the cap and head having interengaging shoulders for preventing relative rotation of cap and holder. This may be conveniently accomplished for example by forming the cap and head non-circular or polygonal in cross section. As shown as an example in Figs. 1-6, the head 25 is pentagonal in cross section. Enclosing the sleeve and having a slip fit over the enlarged head is a long cap 29, also pentagonal in cross section. With the construction described, the exterior angles of the polygonal head form shoulders cooperating with the interior angles of the polygonal cap to prevent relative rotation of cap and holder (Fig. 6).

The invention in its entirety includes a shoulder on the head serving as a positioning stop for the cap and in structures embodying the invention to what is now considered the best advantage, the enlarged head will have its side walls formed in two offset planes forming a shoulder therebetween. In the exemplification illustrated in Figs. 1-6, each side wall of the polygonal head 25 has its lower portion offset outwardly by an amount substantially equal to the thickness of the wall of the cap. This arrangement provides a circumferential shoulder 30 on the head which is engaged by the bottom rim of the cap and so serves as a positioning stop for the latter. By the arrangement described, moreover, the complete holder, when the cap is in place, presents a flush outer surface, as is more clearly illustrated in Figs. 1 and 2.

While the shoulder 30 may be formed in any suitable manner, in the present embodiment it is formed by a cup-shaped end piece 31 having a slip fit over the bottom portion of the enlarged head. This gives the head its offset facets in a manner convenient to manufacture and assemble. Since the head and end piece are polygonal in shape relative rotation is prevented and except for the matter of manufacture and assembly, the end piece is to be considered as part of the head. The end piece may be prevented from slipping off by giving it a close fit, by solder, or by any other suitable means.

Figs. 7-12 illustrate certain features of the invention above described embodied in a different type of holder. In this second embodiment, a carrier cup 41 for a lipstick 42 is slidable in an inner tube 43 having a longitudinal slot 44. Integral with the inner tube is an enlarged operating head 45.

Embracing the inner tube 43 is a two-part unit comprising an outside casing 46 and an intermediate sleeve 47. This intermediate sleeve has a helical slot 48 running from end to end of the same, whereby the sleeve is split, and it is formed of a springy material. When the parts are assembled, the intermediate sleeve 47 is compressed somewhat and by its springy nature it is firmly held to the internal wall of tube 46. Thus, except for the matter of manufacture and assembly, sleeve 47 and tube 46 may be considered as a casing having an internal helical groove. The two slots described form relatively inclined shoulders for engagement by a pin.

On the carrier cup 41 is headed pin 49 the head of which extends through slot 44 into slot 48. The body of the pin extends inwardly of the carrier to serve as a stop and anchorage for the lipstick.

By holding the casing with one hand and turning the operating head to rotate tube 43 within the casing, the carrier cup is caused to be advanced or withdrawn, depending on the direction of rotation.

To prevent relative axial movement of the parts, while permitting relative rotary movement, the sleeve 47 of the present exemplification is confined longitudinally between an upper shoulder, formed by a bead 50, and a lower shoulder 51 formed by the enlarged operating head.

Figure 12:
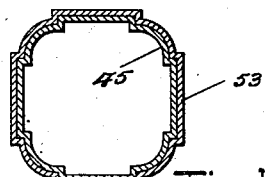
Fig. 12 is an enlarged sectional view taken on the line 12—12 of Fig. 7.

As in the former case, the operating head is non-circular in shape, being generally octagonal with alternate facets fluted, as appears more clearly in Fig. 12.

On the head is a cup-shaped end piece 52 similar to the end piece 31 previously described except that its shape corresponds to the shape of head 45.

The holder is enclosed by a long slip cap 53 of the same cross-sectional shape as head 45. This cap fits over the upper end of the head and its lower end abuts the shoulder 51 formed by end piece 52. Relative rotation of cap and holder is prevented by the mutually engaging shoulders on cap and head formed by the corners and flutings. As in the former case, also, the capped holder presents a flush outer surface, as appears in Fig. 7.

What is claimed is:

1. In a lipstick holder, and in combination, an inner tube and a casing capable of relative rotation, a carrier for a lipstick movable in said tube, an enlarged head connected with said tube and serving as an operating element, the tube and casing having relatively inclined shoulders, a pin on said carrier engaging said shoulders, and a slip cap embracing said casing and taking over the upper portion of said head, the wall of the lower portion of the head being offset outwardly a distance substantially equal to the thickness of the cap wall, thereby providing a stop shoulder for the cap and a flush outer surface for the capped holder, the enlarged head and the cap having mutually engaging shoulders for preventing relative rotation of the cap and holder.

2. In a lipstick holder, and in combination, an inner tube and a casing capable of relative rotation, a carrier for a lipstick movable in said tube, an enlarged head connected with said tube and serving as an operating element, the tube and casing having relatively inclined shoulders, a pin on said carrier engaging said shoulders, a slip cap embracing said casing and taking over the upper portion of said enlarged head, the head and cap having interfitting portions for preventing relative rotation of cap and holder, and a cup-shaped end piece fitting over and secured to the lower end of the enlarged head, the end piece being of substantially the same thickness as the cap.

3. In a lipstick holder, and in combination, an inner tube and a casing capable of relative rotation, a carrier for a lipstick movable in said tube, an enlarged head connected with the lower end of said tube and serving as an operating element, the tube and casing having relatively inclined shoulders, a pin on said carrier engaging said shoulders, a slip cap for enclosing the body of the holder and fitting over the upper part of said head, and a false cap fitting over and secured to the lower part of said head, the upper edge of said false cap serving as a stop for said slip cap.

4. In a lipstick holder, and in combination, a carrier for a lipstick, a tube in which said carrier is movable and having its upper end open for the passage of the lipstick, means including an enlarged operating head located at the lower end of the holder for causing the carrier to be advanced and withdrawn in the tube, and a slip cap for enclosing the body of the holder and taking over the upper portion of said operating head, the wall of the lower portion of the head being offset outwardly a distance substantially equal to the thickness of the cap wall, thereby providing a stop shoulder for the cap and a flush outer surface for the capped holder, the enlarged head and the cap having mutually interfitting portions for preventing relative rotation of the cap and holder.

SHERMAN G. HICKOX.